(12) United States Patent
Orihara et al.

(10) Patent No.: US 10,370,878 B2
(45) Date of Patent: Aug. 6, 2019

(54) TOUCH SENSOR UNIT

(71) Applicant: MITSUBA Corporation, Gunma (JP)

(72) Inventors: Yasuhiro Orihara, Gunma (JP); Hideki Kubota, Gunma (JP); Minori Shoda, Gunma (JP); Mitsuhiro Okada, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 15/927,087

(22) Filed: Mar. 21, 2018

(65) Prior Publication Data
US 2018/0283058 A1    Oct. 4, 2018

(30) Foreign Application Priority Data

Mar. 30, 2017  (JP) .................. 2017-067943

(51) Int. Cl.
| | |
|---|---|
| *E05F 15/40* | (2015.01) |
| *H01H 3/14* | (2006.01) |
| *G06F 3/0354* | (2013.01) |
| *E05B 81/04* | (2014.01) |
| *H01H 3/16* | (2006.01) |

(52) U.S. Cl.
CPC .............. *E05B 81/77* (2013.01); *E05B 81/04* (2013.01); *E05F 15/40* (2015.01); *G06F 3/03547* (2013.01); *H01H 3/141* (2013.01); *H01H 3/161* (2013.01); *B60K 2350/1024* (2013.01)

(58) Field of Classification Search
CPC . E05F 15/40; E05F 15/41; E05F 15/44; E05F 15/48; H01H 3/141; H01H 3/161
See application file for complete search history.

(56) References Cited

U.S. PATENT DOCUMENTS

| | | | | |
|---|---|---|---|---|
| 6,260,418 B1 * | 7/2001 | Ishihara | ............. | H01H 3/142 73/756 |
| 9,059,712 B2 * | 6/2015 | Ishihara | ............. | H03K 17/96 |
| 9,217,679 B2 * | 12/2015 | Ishihara | ............. | G01L 1/04 |
| 9,234,979 B2 * | 1/2016 | Bolbocianu | ............. | G01V 3/02 |
| 9,984,832 B2 * | 5/2018 | Takaba | ............. | H01H 3/142 |

FOREIGN PATENT DOCUMENTS

JP        2012-119309        6/2012

* cited by examiner

*Primary Examiner* — Vanessa Girardi
(74) *Attorney, Agent, or Firm* — JCIPRNET

(57) ABSTRACT

The disclosure provides a touch sensor unit. A conductive component is arranged between a pair of electrodes which are arranged inside an insulating tube, and the conductive component includes: a body section, which extends in a longitudinal direction of the insulating tube; and a convex section, which is arranged on an outer circumference of the body section, extends along the longitudinal direction of the body section, and sinks into the pair of electrodes. Short circuit or non-short circuit and so on of the electrodes can be detected by detecting the resistance value of the conductive component. Merely by inserting the conductive component into one end in the longitudinal direction of the electrodes, the pair of electrodes are electrically connected, and only the convex section sinks into the pair of electrodes, therefore the insertion load of the conductive component can be reduced, and the terminal treatment can be simplified.

8 Claims, 10 Drawing Sheets

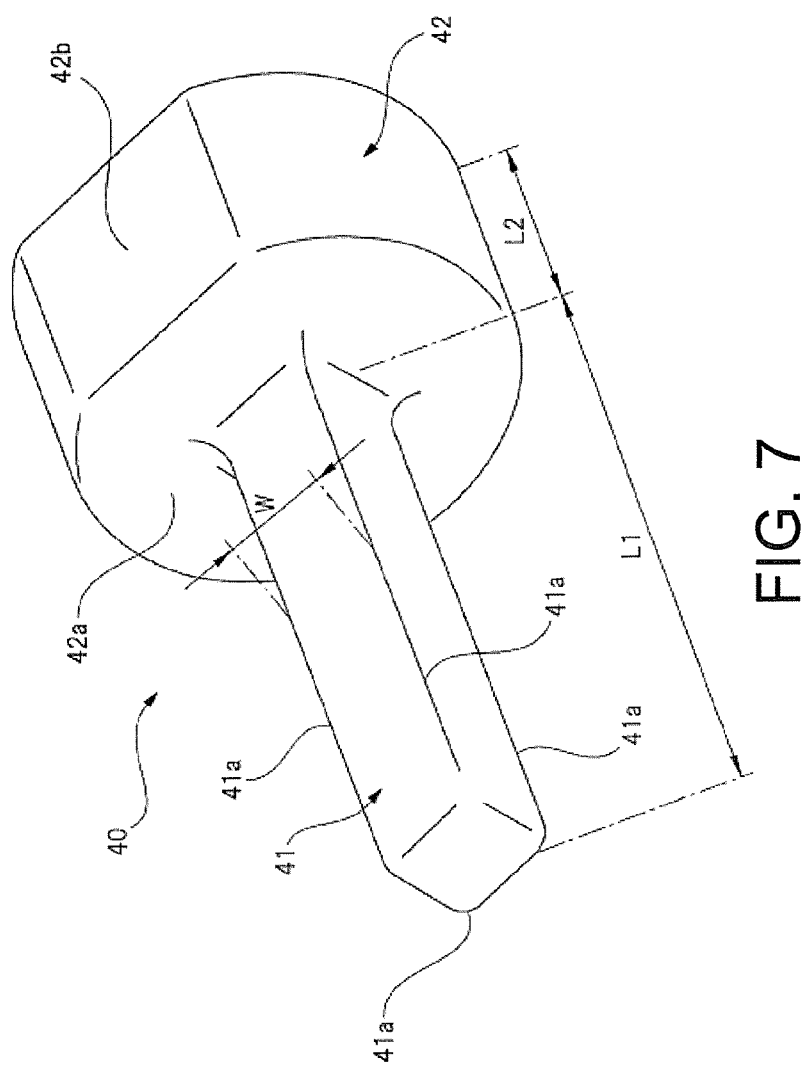

TOUCH SENSOR UNIT

CROSS-REFERENCE TO RELATED APPLICATIONS

This application is based on and claims priority under 35 U.S.C. § 119 to Japanese Patent Application No. 2017-067943, filed on Mar. 30, 2017, the entire content of which is incorporated herein by reference.

TECHNICAL FIELD

The disclosure relates to a touch sensor unit which is used to detect contact with a blocking.

RELATED ART

Conventionally, an automatic opening/closing device mounted on a vehicle such as an automobile includes: an opening/closing body which opens or closes an opening; an electric motor which drives the opening/closing body; and an operation switch which turns the electric motor ON or OFF. An operator operates the operation switch to drive the electric motor, and the opening/closing body is driven to open or close. Besides, the automatic opening/closing device can also drive the opening/closing body according to conditions other than the operation of the operation switch.

For example, the automatic opening/closing device includes a touch sensor unit which detects whether a blocking is stuck between the opening and the opening/closing body. The touch sensor unit is fixed on the opening or the opening/closing body and detects the contact with the blocking. Based on an input of a detection signal from the touch sensor unit, the automatic opening/closing device, without depending on the operation of the operation switch, drives the opening/closing body which is driven to be closed to be opened, or stops the opening/closing body which is driven to be closed immediately.

An example of the touch sensor unit arranged on such automatic opening/closing devices is set forth in Patent Literature 1. A pressure-sensitive sensor (touch sensor unit) set forth in Patent Literature 1 includes an elastic insulating component which has a hollow part, and two electrode wires which are arranged along an internal surface of the elastic insulating component and across a longitudinal direction. Leading wires of a resistor (an electronic component) are electrically connected to one end of the two electrode wires in the longitudinal direction via metal terminals, respectively.

[Patent Literature 1] Japanese Laid-open No. 2012-119309

SUMMARY

However, as for the touch sensor unit set forth in Patent Literature 1, problems as follows may occur during the manufacturing of the touch sensor unit. That is, leading wires of the resistor must be electrically connected to the end of the touch sensor unit with a diameter size of about 5.0 mm by the welding of metal terminals and so on, making the terminal treatment sophisticated and complicated. Besides, a pair of metal terminals are needed, leading to the increasing of components and a raise in cost.

The disclosure is directed to provide a touch sensor unit which can simplify the terminal treatment and reduce cost.

One aspect of the disclosure provides a touch sensor unit, which is used to detect contact of a blocking, including: a hollow insulating component, which deforms elastically due to a stress of an external force; a pair of electrodes, which are arranged inside the insulating component, extend spirally along a longitudinal direction of the insulating component, and are placed to be capable of contacting with each other by an elastic deformation of the insulating component; and a conductive component, which is arranged at one end of the longitudinal direction of the pair of electrodes, and electrically connects with the pair of electrodes respectively; wherein the conductive component includes: a body section, which is arranged between the pair of electrodes, and extends along the longitudinal direction of the insulating component; and a convex section, which is arranged on an outer circumference of the body section, extends along the longitudinal direction of the body section, and sinks into the pair of electrodes.

In another aspect of the disclosure, at least three convex sections are arranged in a circumferential direction of the body section.

In another aspect of the disclosure, a length of the body section is a length obtained by winding the pair of electrodes which are spirally arranged for at least half a circumference respectively.

In another aspect of the disclosure, the conductive component includes a head which abuts on one end in the longitudinal direction of the pair of electrodes.

In another aspect of the disclosure, the conductive component is made of a conductive resin material.

In another aspect of the disclosure, the conductive component is made of a steel plate having a surface coated with a conductive paint.

In another aspect of the disclosure, the conductive paint is coated on a part of the surface of the conductive component.

In another aspect of the disclosure, the touch sensor unit is arranged on an automatic opening/closing device mounted on a vehicle.

According to the disclosure, a conductive component is arranged between a pair of electrodes which are arranged inside an insulating component, and the conductive component includes: a body section, which extends in a longitudinal direction of the insulating component; and a convex section, which is arranged on an outer circumference of the body section, extends along the longitudinal direction of the body section, and sinks into the pair of electrodes. In this way, short circuit or non-short circuit and so on of the electrodes can be detected by detecting the resistance value of the conductive component by a controller and so on.

Moreover, merely by inserting the conductive component into one end in the longitudinal direction of the pair of electrodes, the pair of electrodes can be electrically connected, and the terminal treatment can be simplified. In this case, only the convex section sinks into the pair of electrodes, therefore the insertion load of the conductive component can be reduced, and the terminal treatment can be further simplified.

Furthermore, conventional metal terminals are not needed, therefore the number of components can be decreased, and the cost is reduced.

BRIEF DESCRIPTION OF THE DRAWINGS

FIG. 7 is a perspective view showing a conductive component of embodiment 1.

DESCRIPTION OF THE EMBODIMENTS

Embodiment 1 of the disclosure is described in detail below with reference to the drawings.

Figure 1:
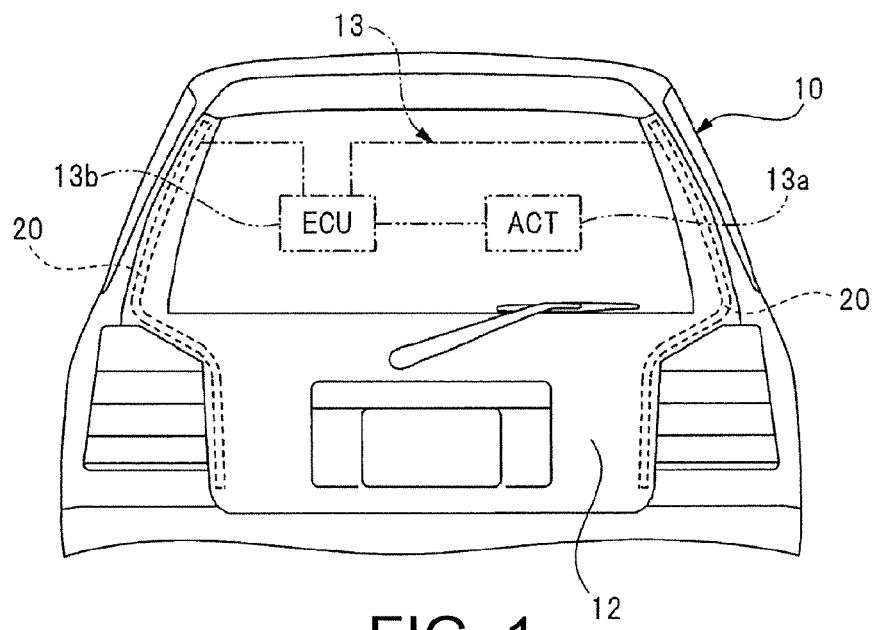
FIG. 1 is a front view of a tailgate equipped with a touch sensor unit.
Figure 2:
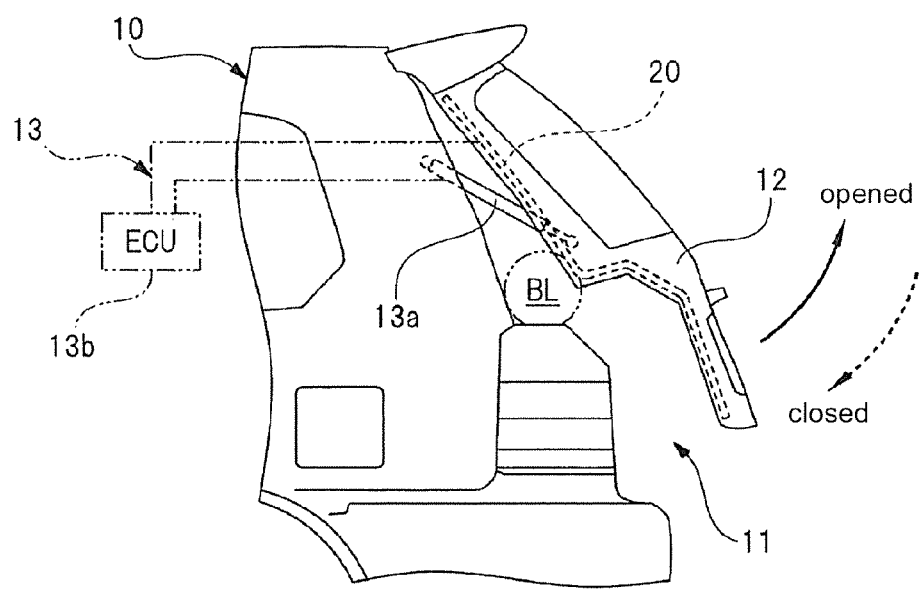
FIG. 2 is a side view obtained by observing laterally from a rear side of a vehicle in FIG. 1.
Figure 3:
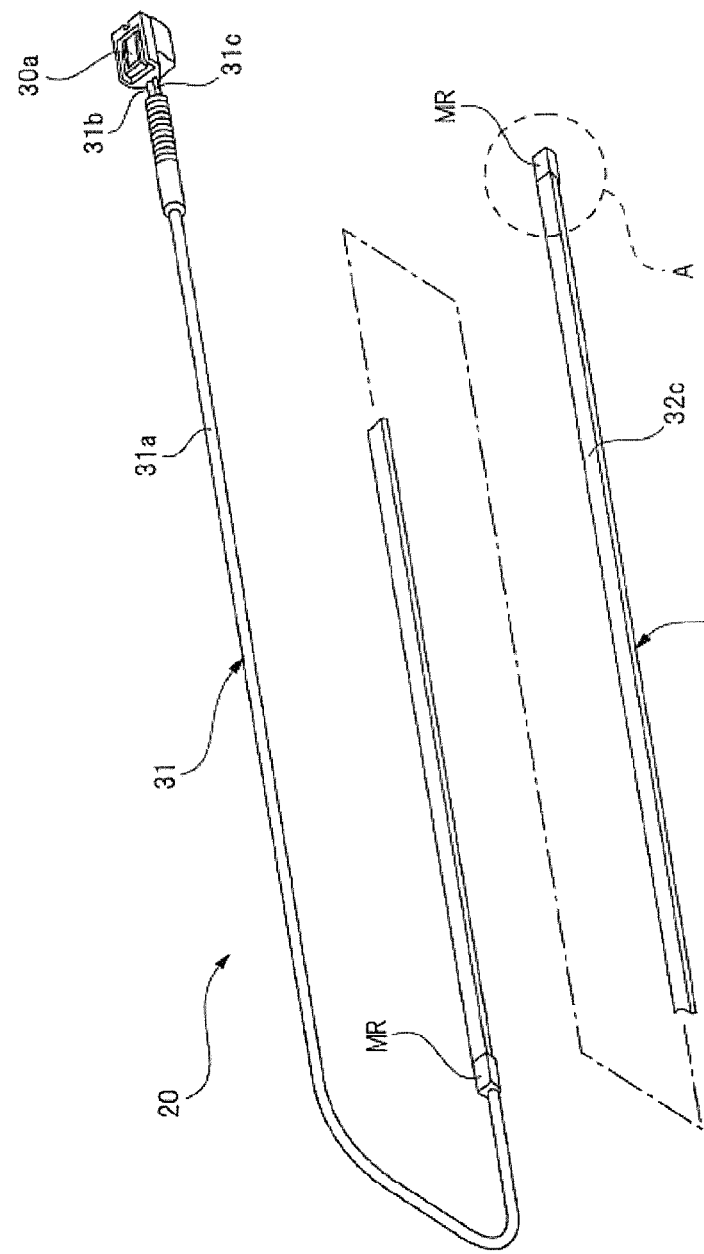
FIG. 3 is a perspective view showing the touch sensor unit.
Figure 4:
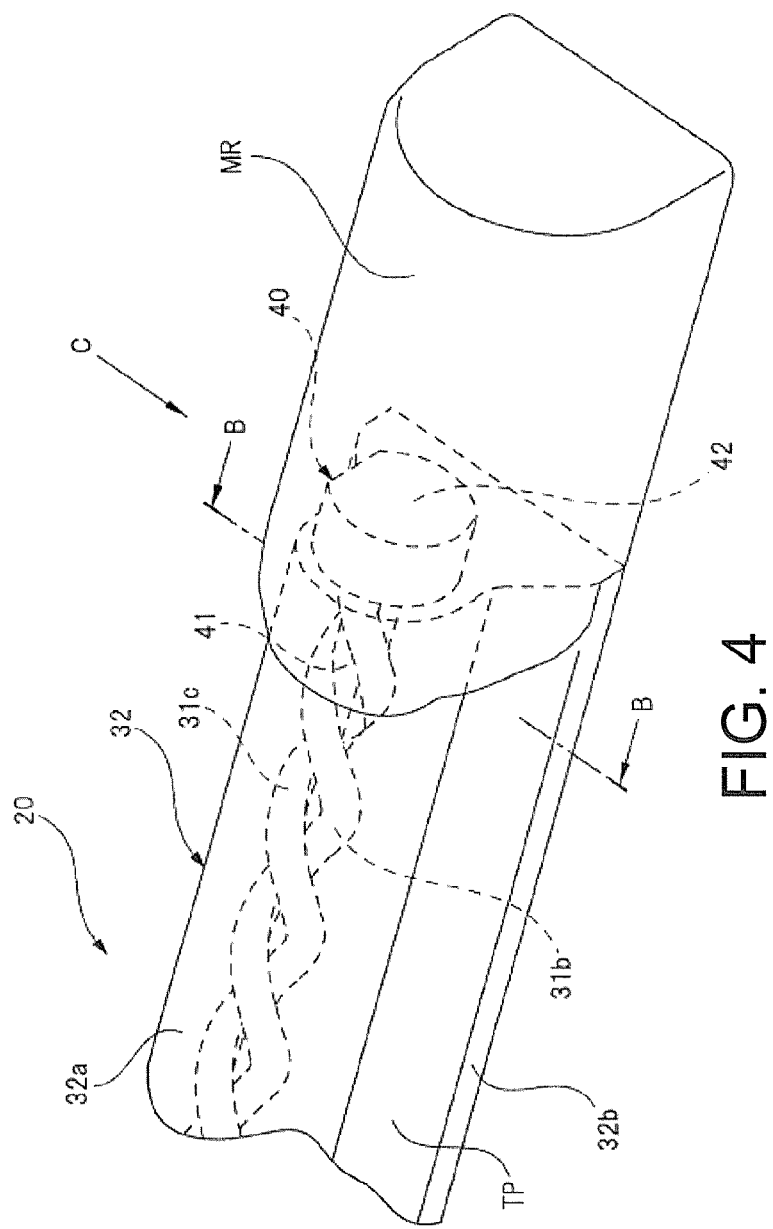
FIG. 4 is an enlarged view of a dashed circle A section in FIG. 3.
Figure 5:
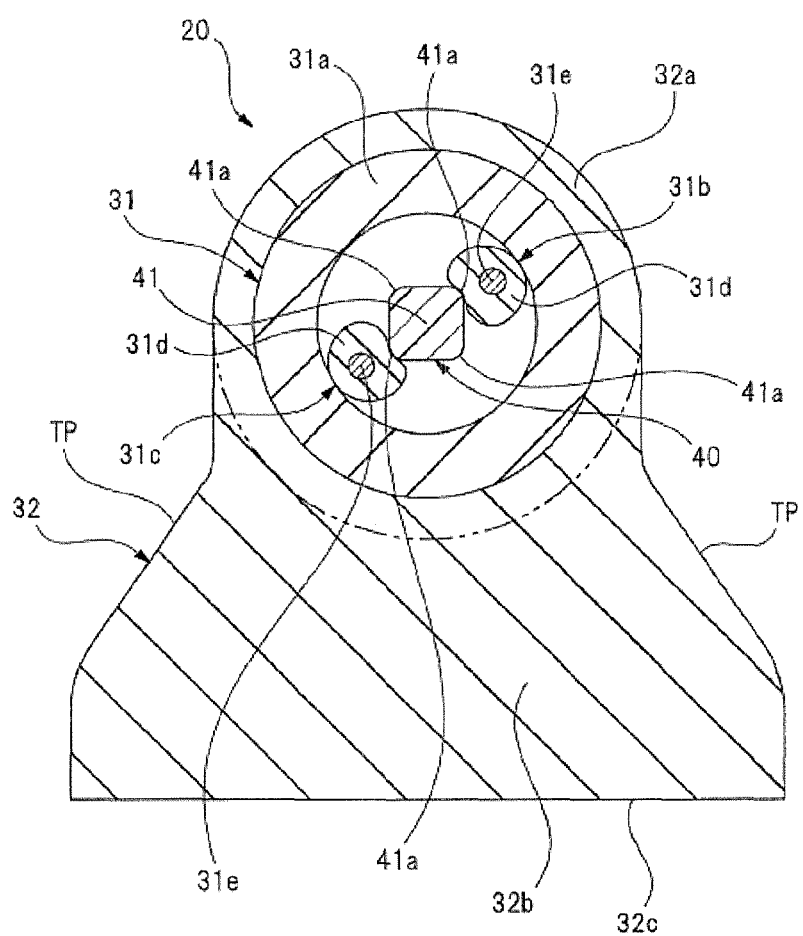
FIG. 5 is a sectional view along a B-B line in FIG. 4.
Figure 6:
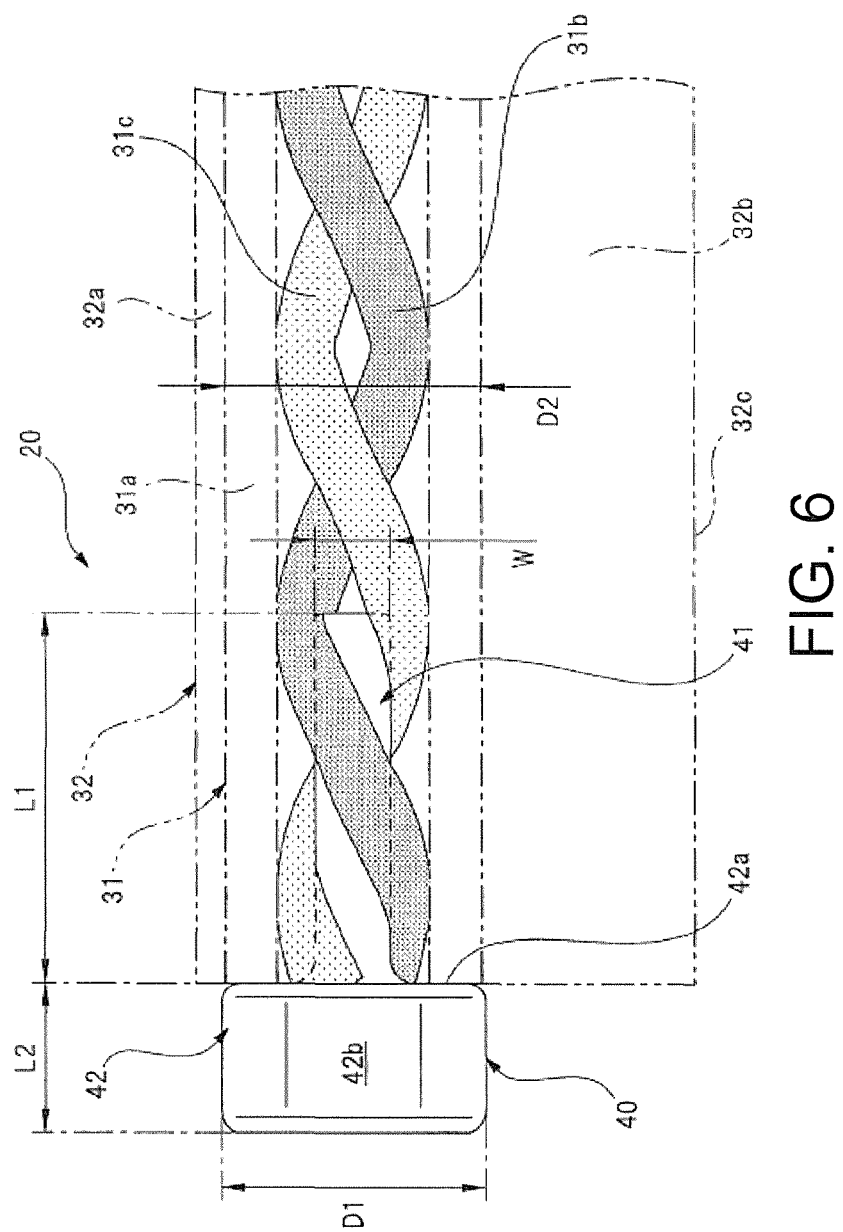
FIG. 6 is an illustrative drawing illustrating a spiral state of a pair of electrodes observed from a direction of arrow C in FIG. 4.
Figure 8A:
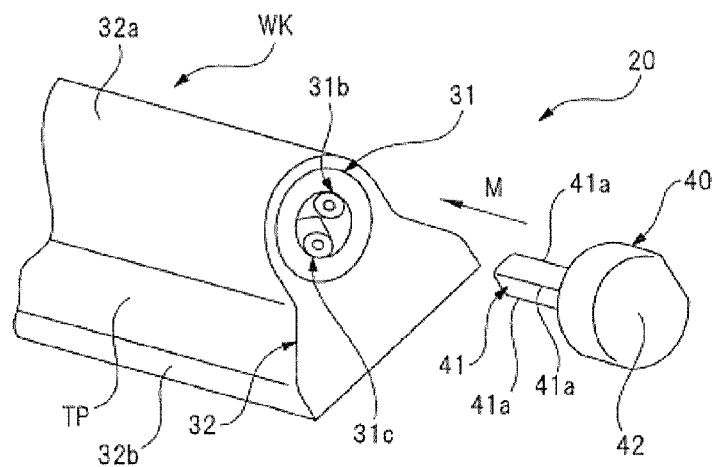
FIG. 8A and FIG. 8B are illustrative drawings illustrating a terminal treatment of the touch sensor unit.
Figure 8B:
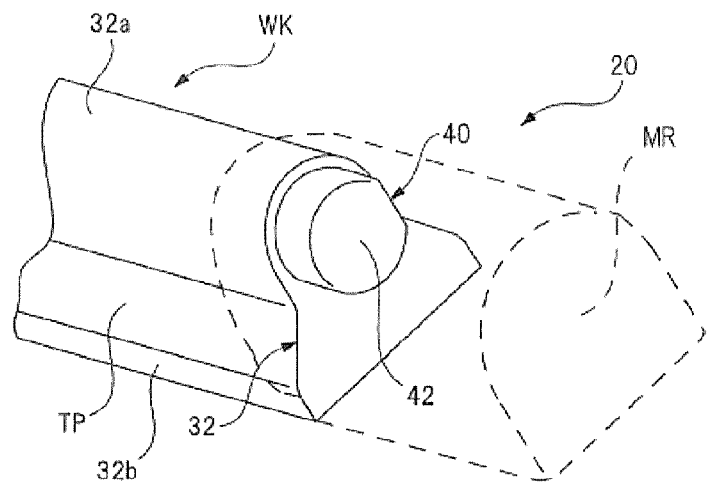
Figure 9:
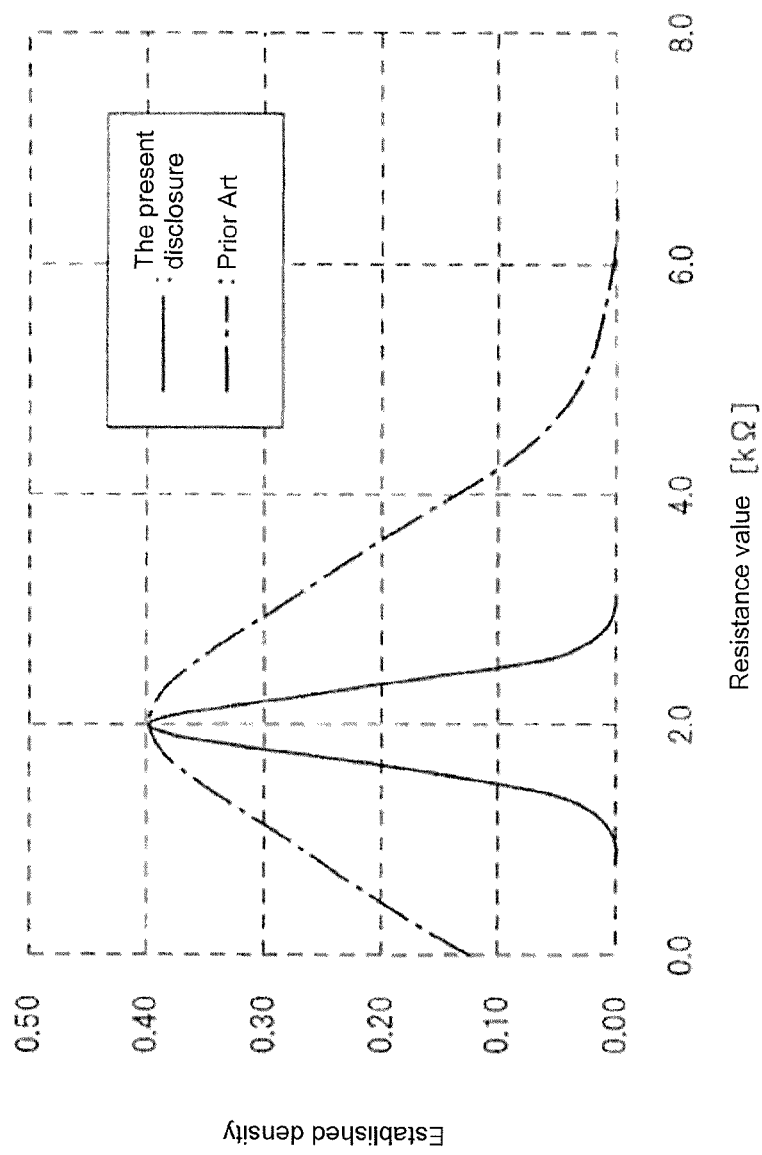
FIG. 9 is a graph obtained by comparing a dispersion situation of resistance value in the prior art and a dispersion situation of resistance value in the disclosure.

FIG. 1 is a front view of a tailgate equipped with a touch sensor unit. FIG. 2 is a side view obtained by observing laterally from a rear side of a vehicle in FIG. 1. FIG. 3 is a perspective view showing the touch sensor unit. FIG. 4 is an enlarged view of a dashed circle A section in FIG. 3. FIG. 5 is a sectional view along a B-B line in FIG. 4. FIG. 6 is an illustrative drawing illustrating a spiral state of a pair of electrodes observed from a direction of arrow C in FIG. 4. FIG. 7 is a perspective view showing a conductive component of embodiment 1. FIG. 8A and FIG. 8B are illustrative drawings illustrating a terminal treatment of the touch sensor unit. FIG. 9 is a graph obtained by comparing a dispersion situation of resistance value in the prior art and a dispersion situation of resistance value in the disclosure.

A vehicle 10 shown in FIG. 1 and FIG. 2 is a so-called hatchback vehicle, and an opening 11 is formed on the rear side of the vehicle 10 for large baggage to be get in and out of the vehicle interior. The opening 11 is opened and closed, as shown by the solid arrow and dashed arrow in FIG. 2, by a tailgate (opening/closing body) 12 which pivots around a hinge (not shown) arranged on a rear side of a ceiling of the vehicle 10.

Besides, a power tailgate device (automatic opening/closing device) 13 is mounted on the vehicle 10 according to this embodiment. The power tailgate device 13 includes: an actuator 13a, which opens and closes the tailgate 12 and is equipped with a speed reducer; a controller 13b, which controls the actuator 13a based on operation signals of an operation switch (not shown); and a pair of touch sensor units 20, which detect contact of a blocking BL.

As shown in FIG. 1, the touch sensor units 20 are arranged respectively on two sides of the tailgate 12 in the width direction of the vehicle (the right and left sides in the drawing). More specifically, the pair of touch sensor units 20 are disposed along a bending shape of a door frame on two sides of the tailgate 12 in the width direction of the vehicle. That is, the pair of touch sensor units 20 follow a bending shape of a door frame to be set in a bending state, and the pair of touch sensor units 20 are fixed on the tailgate 12 based on the bending state. In this way, when the blocking BL contacts with the touch sensor units 20 between the opening 11 and the tailgate 12, the touch sensor units 20 immediately deform elastically.

Each touch sensor unit 20 is electrically connected to the controller 13b, and detection signals generated during an elastic deformation of each touch sensor units 20 are input to the controller 13b. Based on the input of the detection signals from each touch sensor unit 20, the controller 13b drives the tailgate 12 which is driven to be closed to be opened without depending on the operation of the operation switch, or stops the tailgate 12 which is driven to be closed immediately. In this way, the inserting of the blocking BL is prevented in advance.

Here, as shown in FIG. 3 to FIG. 6, a pair of electrodes 31b and 31c are arranged on the touch sensor units 20, and a conductive component 40 which has a predetermined resistance value is electrically connected to the front end side (the right side in FIG. 4) of the touch sensor units 20. In this way, in a state where the touch sensor units 20 do not deform elastically, the pair of electrodes 31b and 31c does not contact with each other, and the resistance value of the conductive component 40 is input to the controller 13b. That is, in the case when the resistance value of the conductive component 40 is input, the controller 13b determines that no blocking BL is stuck, and continues driving the tailgate 12 to close.

On the contrary, when the blocking BL contacts with the touch sensor units 20 and the touch sensor units 20 deform elastically, the pair of electrodes 31b and 31c contact with each other and are short circuited. Then, a resistance value not via the conductive component 40 is input to the controller 13b. In this way, the controller 13b detects the change of the resistance value and, triggered by the change of the resistance value, implements the control which drives the tailgate 12 to be opened or stops the tailgate 12 immediately.

As shown in FIG. 5, the touch sensor units 20 include: a sensor body 31 formed to a shape of a long string; and a sensor holder 32 holding the sensor body 31. Here, the sensor holder 32 is fixed by a double-faced tape or an adhesive agent and so on to a sensor bracket which is not shown, and the sensor bracket is fixed by a double-faced tape or an adhesive agent and so on to a predetermined position of the tailgate 12 (see FIG. 1 and FIG. 2).

As shown in FIG. 3, on a base end side of the touch sensor units 20, base end sides of the pair of electrodes 31b and 31c are disposed, and on the base end of each electrode 31b and 31c, a male connector 30a which is set on a female connector (not shown) of the controller 13b (see FIG. 1 and FIG. 2) is arranged. Besides, the two ends of the sensor holder 32 are protected by a molding resin MR.

As shown in FIG. 5, the sensor body 31 includes a hollow insulating tube (insulating component) 31a which contains an insulating rubber material with flexibility and so on. The insulating tube 31a deforms elastically due to a stress of an external force, and the pair of electrodes 31b and 31c are spirally held on an inner side (interior) in a diameter direction of the insulating tube 31a. The electrodes 31b and 31c include a conductive tube 31d which contains a conductive rubber with flexibility and so on, and a conductive wire 31e formed by bundling several copper strings is arranged inside the conductive tube 31d.

By spirally placing and fixing each electrode 31b and 31c in a way of extending on the inner side of the insulating tube 31a in the diameter direction and along the longitudinal direction of the insulating tube 31a, even if the blocking BL (see FIG. 2) contacts with any position along a circumferential direction of the sensor body 31 and the insulating tube 31a deforms elastically, the electrodes 31b and 31c contact with each other under about the same condition (pressing force) and are short circuited. That is, the variation in detection sensitivity in accordance with the position of the insulating tube 31a is kept to a minimum.

As shown in FIG. 5, the sensor holder (insulating component) 32 is formed in an elongated shape by extruding and molding an insulating rubber material with flexibility. More specifically, the sensor body 31 formed in advance in other manufacturing process is extruded from a mold together with a rubber material (not shown) softened by heating, by which the sensor holder 32 equipped with the sensor body 31 is formed. In this way, a part of the surface of the insulating tube 31a is melted by the high-temperature rubber material, the sensor holder 32 is structurally integrated with a part of the insulating tube 31a and the two components are tightly fixed to each other. Moreover, the operation of mounting the sensor body 31 to the sensor holder 32 after the formation of the sensor holder 32 is not needed, therefore the assembling procedure can also be simplified.

The sensor holder 32 includes a hollow sensor section 32a inside which the sensor body 31 is held, and a base section 32b which is fixed to a sensor bracket (not shown). In addition, the two-dot chain line in FIG. 5 represents a boundary of the sensor section 32a and the base section 32b.

The cross section of the sensor section 32a along a direction across the longitudinal direction of the sensor holder 32 is approximately circularly shaped, and the wall thickness of the sensor section 32a becomes smaller than the wall thickness of the insulating tube 31a. That is, the sensor section 32a is easy to deform elastically due to the stress of the external force. In this way, the electrodes 31b and 31c held on the sensor section 32a via the insulating tube 31a easily contact with each other due to the elastic deformation of the sensor section 32a, and sufficient detection performance of the sensor body 31 is ensured.

The base section 32b is formed integrated with the sensor section 32a along the longitudinal direction of the sensor section 32a, and has a function of fixing the sensor section 32a to the sensor bracket. The cross section of the base section 32b along a direction across the longitudinal direction of the sensor holder 32 is approximately trapezoidal shaped, and a double-faced tape (not shown) used to fix the sensor holder 32 to the sensor bracket is adhered to a bottom surface 32c of the base section 32b.

Here, as shown in FIG. 5, when the vertical direction in the drawing is set as the height direction, the sensor section 32a and the base section 32b overlap with each other in the height direction. Besides, when the horizontal direction in the drawing, which is across the height direction, is set as the width direction, the width of the sensor section 32a is smaller than the width of the base section 32b.

In addition, the sensor section 32a and the base section 32b are connected via a pair of tilted planes TP so that the two components are smoothly connected with each other. By arranging the tilted planes TP between the sensor section 32a and the base section 32b in this way, the situation in which stress concentrates in-between the sensor section 32a and the base section 32b and leads to cracks and so on is avoided. In this way, the durability of the sensor holder 32 is enhanced.

By making the cross-section shape of the sensor holder 32 along the direction across the longitudinal direction of the sensor body 31 non-circular in this way, the sensor section 32a is easy to deform elastically, the stiffness of the base section 32b is sufficient, and the strength of fixing to the sensor bracket of the sensor holder 32 is sufficiently ensured.

As shown in FIG. 4, on the front end side of the touch sensor units 20, a conductive component 40 with a predetermined resistance value is arranged. More specifically, the conductive component 40 is fixed by inserting a body section 41 (see FIG. 7) into the front end side (one end in the longitudinal direction) of the sensor body 31 (see FIG. 5 and FIG. 6) held on the sensor holder 32.

In order to seal the space between the conductive component 40 and the sensor body 31 (the sensor holder 32), the space between the conductive component 40 and the sensor body 31 (the sensor holder 32) is covered by molding resin MR. In this way, invasion of rain or dust and so on into the interior of the sensor body 31 (the section of the pair of electrodes 31b and 31c) is avoided.

As shown in FIG. 6 and FIG. 7, the conductive component 40 is formed to a predetermined shape by a conductive resin material which is obtained by containing a predetermined quantity of carbon (C) particles (carbon black). The conductive component 40 includes a body section 41 which extends along the longitudinal direction of the insulating tube 31a and is inserted into the insulating tube 31a, and a head 42 which limits the insertion depth of the body section 41 into the insulating tube 31a.

Here, in this embodiment, the resistance value of the conductive component 40 is set to "2 k$\Omega$-8 k$\Omega$" for example by adjusting the carbon content in the resin material (for example, polyacetal (POM) and so on) which becomes the base material.

In this way, by detecting a resistance value of "2 k$\Omega$~8 k$\Omega$", the controller 13b (see FIG. 1 and FIG. 2) determines that no blocking BL is stuck. Besides, by detecting a small resistance value of "less than 1 k$\Omega$" for example, the controller 13b determines that the electrodes 31b and 31c (see FIG. 5) are short circuited (the blocking BL is stuck). Furthermore, by detecting a large resistance value of "more than 13.5 k$\Omega$" for example, the controller 13b determines that at least one of the electrodes 31b and 31c is disconnected (unenergized state).

As shown in FIG. 7, the body section 41 is approximately formed to a rectangular solid, and the cross section along the direction across the longitudinal direction is approximately square-shaped. And on the outer circumference section of the body section 41, four convex sections 41a extending along the longitudinal direction of the body section 41 are arranged. The convex sections 41a are arranged across the whole area in the longitudinal direction of the body section 41, and sink into the electrodes 31b and 31c in the state of being inserted into the space between the electrodes 31b and 31c inside the insulating tube 31a (see FIG. 5). Accordingly, the front end sides (the ends in the longitudinal direction) of the electrodes 31b and 31c are definitely electrically connected with each other via each convex section 41a of the body section 41.

Moreover, when inserting the body section 41 into the space between the electrodes 31b and 31c inside the insulating tube 31a, only the four convex sections 41a sink into the electrodes 31b and 31c respectively. Therefore, comparing with the situation in which the body section with a cylindrical cross-section shape is pressed to insert into the space between each electrode (not shown), the insertion load of the conductive component 40 to the insulating tube 31a can be lessened.

Therefore, the conductive component 40 does not need to be inserted under great pressing force, and the loss of the conductive component 40 and so on are certainly avoided. In particular, by making the width W (thickness) of the body section 41 to about 1.0 mm and containing carbon, the strength of the body section 41 reduces. Accordingly, reducing the insertion load as in this embodiment is one of the important problems to be solved. In this way, the operation of mounting the conductive component 40 to the insulating tube 31a (terminal treatment) is simplified and the yield is raised.

Furthermore, the four convex sections 41a are disposed on the circumferential direction of the body section 41 with equal intervals (intervals of 90°). Accordingly, when the body section 41 is inserted into the space between the electrodes 31b and 31c inside the insulating tube 31a, the body section 41 is automatically centered on the central part of the insulating tube 31a (the electrodes 31b and 31c). Therefore, the operation of mounting the conductive component 40 to the insulating tube 31a (terminal treatment) can also be simplified accordingly.

Besides, as shown in FIG. 6, the length L1 of the body section 41 along the longitudinal direction of the insulating tube 31a is the length (a length of 0.5 pitch) obtained by winding the electrodes 31b and 31c, which are spirally arranged inside the insulating tube 31a, for half a circumference toward the outer circumference of the body section 41 in a state of inserting the body section 41 into the insulating tube 31a. In this way, the body section 41 inserted into the space between the electrodes 31b and 31c is effectively prevented from tilting or shaking inside the insulating tube 31a.

In other words, the length L1 of the body section 41 is set to an optimal length which simplifies the operation of inserting the body section 41 into the space between the electrodes 31b and 31c at the utmost and at which the conductive component 40 can be mounted securely between the electrodes 31b and 31c.

In addition, in FIG. 6, the electrodes 31b and 31c are shaded (heavy/light) in order to easily determine the winding state of the electrodes 31b and 31c toward the body section 41.

In the base end section of the body section 41 in the longitudinal direction, a head 42 is integrally disposed. The head 42 is approximately cylinder-shaped, and the length L2 of the head 42 along the longitudinal direction of the insulating tube 31a is about ⅓ of the length L1 of the body section 41 (L2≈L1/3). Besides, the diameter size D1 of the head 42 is about the same as the outer diameter D2 of the insulating tube 31a (D1≈D2), and about four times the width W of the body section 41 (D1≈4×W).

In this way, an abutting surface 42a formed on the body section 41 side of the head 42 abuts against the front end side (the end in the longitudinal direction) of the insulating tube 31a. The front end sides of the electrodes 31b and 31c inside the insulating tube 31a also abuts against the abutting surface 42a of the head 42. Therefore, the front end sides of the electrodes 31b and 31c are also certainly and electrically connected with each other via the head 42 accordingly.

Moreover, on the lateral surface on the external side of the head 42 in the diameter direction, a flat plane 42b formed by scraping a part of the head 42 is arranged. Here, when inserting the body section 41 into the space between the electrodes 31b and 31c inside the insulating tube 31a, the head 42 becomes a section which is gripped by a jig and so on (not shown). Therefore, by arranging the flat plane 42b, the grip by the jig can be easily done.

Furthermore, when inserting the body section 41 into the space between the electrodes 31b and 31c inside the insulating tube 31a, the operation of screwing into the body section 41 by the jig can also be performed on the flat plane 42b. More specifically, by arranging the flat plane 42b, the head 42 does not run idle in relative to the jig. Accordingly, the operation of inserting the body section 41 into the space between the electrodes 31b and 31c can be further simplified.

Next, the manufacturing method of the touch sensor unit 20 formed in the way above, in particular, the terminal treatment on one end side of the touch sensor unit 20 in the longitudinal direction is described in detailed with reference to the drawings.

First, as shown in FIG. 8A, the sensor holder 32 equipped with the sensor body 31 (referred to as work WK for short hereinafter), which is formed by extruding and molding in other manufacturing process, is prepared. At this time, the work WK is cut to a predetermined length in accordance with the type of the vehicle 10 (see FIG. 1 and FIG. 2). Next, the conductive component 40 formed in other manufacturing process (injection molding and so on) is prepared, the front end side of the body section 41 in the conductive component 40 is made to face one end side (front end side) of the work WK in the longitudinal direction.

After that, as shown by an arrow M in the drawing, the conductive component 40 is moved and the front end side of the body section 41 is inserted into the space between the electrodes 31b and 31c. At this time, the head 42 is gripped by the jig and the jig is pressed by a predetermined pressure. In addition, the operation of the jig may be manually performed by the operator, or may be automatically performed by an assembled robot. Besides, in order to raise the assembling efficiency, the conductive component 40 may also be twisted while the body section 41 is inserted into the space between the electrodes 31b and 31c. In this way, each convex section 41a sink into the electrodes 31b and 31c respectively, and the state shown in FIG. 5 and FIG. 6 is achieved.

Next, the work WK with the inserted conductive component 40 is set to a work mounting concave (not shown) of a lower mold of the injection molding device. After that, an upper mold (not shown) of the injection molding device is made to butt with the lower mold and molten resin (not shown) is filled in a cavity formed inside the upper and lower molds. After that, the molten resin is hardened by cooling and so on, and the work WK is released from the upper and lower molds. Then, as shown by the dashed section in FIG. 8B, the space between the conductive component 40 and the work WK (between the sensor body 31 and the sensor holder 32) is covered by molding resin MR.

In this way, the terminal treatment on one end side (the side where the conductive component 40 is mounted) of the work WK in the longitudinal direction is finished, and the terminal treatment on one end side of the touch sensor unit 20 in the longitudinal direction is finished.

Here, it is clear that compared with the touch sensor unit of the prior art which electrically connects the pair of leading wires of the electronic component, i.e. the resistor, to each electrodes respectively by welding the metal terminal, the throughput of the touch sensor unit 20 according to the disclosure is excellent. In the following part, the graph in FIG. 9 illustrating the "established density" is used to describe this fact.

As shown by a solid line in FIG. 9, it is clear that in the touch sensor unit 20 of the disclosure, most of the measured resistance values of the several prepared touch sensor units 20 is the specification of the touch sensor units 20, i.e. the resistance value of "2 kΩ". Even when the variation in the measured resistance values of the touch sensor units 20 of the disclosure is taken into consideration, the range is "1 kΩ-3 kΩ" at the most, and the variation can be modified on the controller 13*b* (see FIG. 1 and FIG. 2) side, accordingly, the disclosure is sufficient to be used as a product. In other words, for the touch sensor units 20 of the disclosure, defective product seldom occurs and the yield is high.

On the contrary, as shown by a one-dot chain line of FIG. 9, it is clear that in the touch sensor unit of the prior art, the measured resistance values of the several prepared touch sensor units vary in a wide range. This is caused by the variation in the resistor itself, the variation in the shape of the metal terminals, or the variation in the welding conditions, and so on. The wide variation in the touch sensor unit of the prior art cannot be solved by the modification on the controller 13*b* side, and the touch sensor units which can be modified on the controller 13*b* side must be selected every time based on careful check. In other words, for the touch sensor unit of the prior art, defective product easily occurs and the yield is low.

According to the above, it is clear that the throughput of the touch sensor unit 20 of the disclosure is excellent compared with the touch sensor unit of the prior art. In this way, compared with the conventional situation, the yield can be improved and the manufacturing cost can be reduced, and the number of components is decreased, realizing the provision of inexpensive touch sensor unit.

As described above in detail, according to the embodiment 1, the conductive component 40 is arranged between the pair of electrodes 31*b* and 31*c* which are arranged inside the insulating tube 31*a* (sensor holder 32), and the conductive component 40 includes the body section 41 which extends along the longitudinal direction of the insulating tube 31*a* (sensor holder 32), and the convex section 41*a* which is arranged on the outer circumference of the body section 41, extends along the longitudinal direction of the body section 41 and sink into the pair of electrodes 31*b* and 31*c*. In this way, short circuit or non-short circuit and so on of the electrodes 31*b* and 31*c* can be detected by detecting the resistance value of the conductive component 40 by the controller 13*b*.

Moreover, merely by inserting the conductive component 40 into one end in the longitudinal direction of the pair of electrodes 31*b* and 31*c*, the pair of electrodes 31*b* and 31*c* can be electrically connected, and the terminal treatment can be simplified. In this case, only the convex section 41*a* sinks into the pair of electrodes 31*b* and 31*c*, therefore the insertion load of the conductive component 40 can be reduced, and the terminal treatment can be further simplified.

Furthermore, conventional metal terminals are not needed, therefore the number of components can be decreased, and the cost is reduced.

Besides, according to the embodiment 1, four convex sections 41*a* are disposed on the circumferential direction of the body section 41 with equal intervals (intervals of 90°), therefore, by inserting the body section 41 into the space between the electrodes 31*b* and 31*c* inside the insulating tube 31*a*, the body section 41 can be automatically centered on the central part of the insulating tube 31*a* (the electrodes 31*b* and 31*c*).

Furthermore, according to the embodiment 1, the length of the body section 41 is the length L1 obtained by winding the spirally arranged pair of electrodes 31*b* and 31*c* respectively for at least half a circumference (see FIG. 6), therefore, the body section 41 inserted into the space between the electrodes 31*b* and 31*c* is effectively prevented from tilting or shaking inside the insulating tube 31*a*.

Moreover, according to the embodiment 1, the conductive component 40 includes a head 42 which abuts against one end of the pair of electrodes 31*b* and 31*c* in the longitudinal direction, so that the insertion depth of the body section 41 into the insulating tube 31*a* is limited, and the variation in the insertion depth with respect to each product can be avoided. Accordingly, the variation in the resistance value with respect to each product can be effectively limited.

Furthermore, according to the embodiment 1, the conductive component 40 is made of conductive resin material which is formed by containing a predetermined quantity of carbon (C) particles (carbon black), therefore, by the injection molding and so on, which use a mold, the conductive component 40 can be mass produced without variation. Accordingly, the manufacturing cost can also be reduced in this way.

Next, an embodiment 2 of the disclosure is described in detail with reference to the drawings. In addition, sections having the same function as the embodiment 1 are marked with the same symbols, and the detailed description is omitted.

Figure 10:
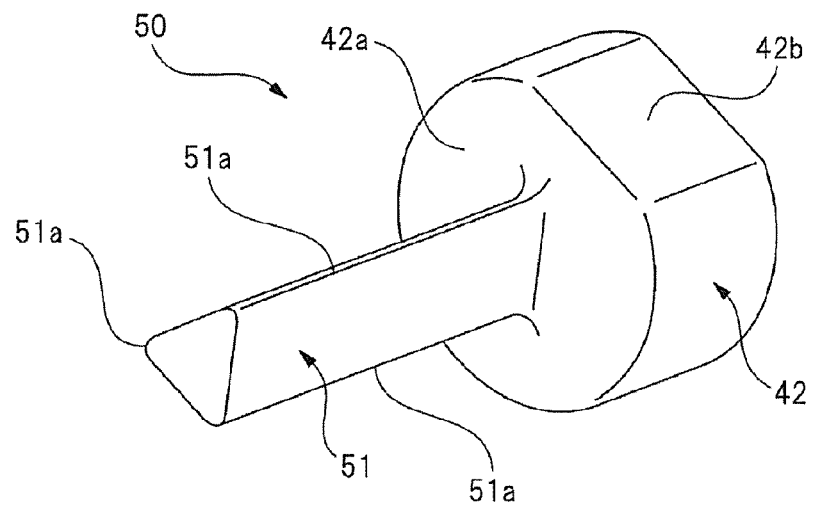
FIG. 10 is a perspective view showing a conductive component of embodiment 2.

FIG. 10 is a perspective view showing a conductive component of the embodiment 2.

The only difference of a conductive component 50 of the embodiment 2 is the shape of a body section 51. More specifically, the cross section of the body section 51 along a direction across the longitudinal direction is approximately equilateral triangle-shaped. And on the outer circumference section of the body section 51, three convex sections 51*a* extending along the longitudinal direction of the body section 51 are arranged. These convex sections 51*a* are arranged across the whole area of the body section 51 in the longitudinal direction, and sink into the electrodes 31*b* and 31*c* in the state of being inserted into the space between the electrodes 31*b* and 31*c* (see FIG. 5) inside the insulating tube 31*a*. Besides, the three convex sections 51*a* are disposed with equal intervals (an interval of 120°) along the circumferential direction of the body section 51.

In the embodiment 2 formed in this way, the same effect as the embodiment 1 can also be achieved. Additionally, in the embodiment 2, the sections sunk into the electrodes 31*b* and 31*c* can be reduced to three positions, therefore, compared with the embodiment 1, the insertion load of the conductive component 50 into the electrodes 31*b* and 31*c* can be decreased. Accordingly, the loss of the conductive component 50 and so on can be more definitely avoided.

Next, an embodiment 3 of the disclosure is described in detail with reference to the drawings. In addition, sections having the same function as the embodiment 1 are marked with the same symbols, and the detailed description is omitted.

Figure 11:
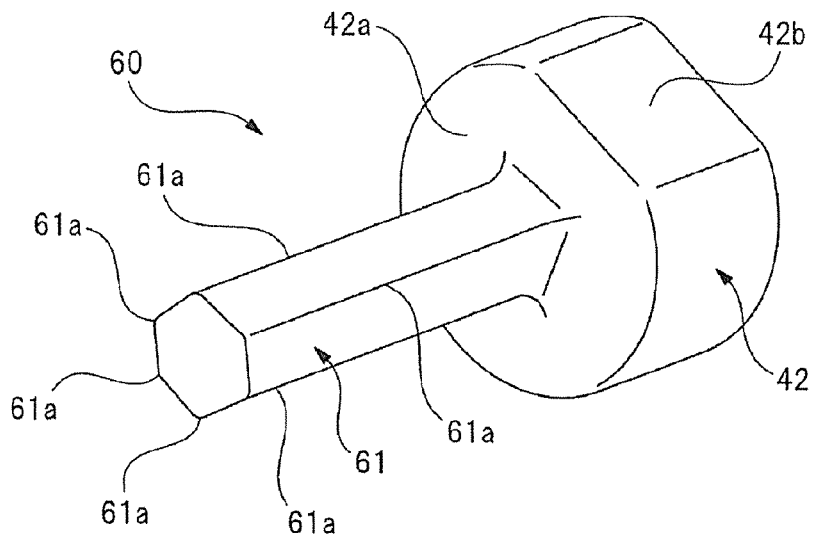
FIG. 11 is a perspective view showing a conductive component of embodiment 3.

FIG. 11 is a perspective view showing a conductive component of the embodiment 3.

The only difference of a conductive component 60 of the embodiment 3 is the shape of a body section 61. More specifically, the cross section of the body section 61 along a direction across the longitudinal direction is approximately regular hexagon-shaped. And on the outer circumference section of the body section 61, six convex sections 61*a* extending along the longitudinal direction of the body section 61 are arranged. These convex sections 61*a* are arranged across the whole area of the body section 61 in the longitudinal direction, and sink into the electrodes 31*b* and 31*c* in the state of being inserted into the space between the electrodes 31*b* and 31*c* (see FIG. 5) inside the insulating tube 31*a*. Besides, the six convex sections 61*a* are disposed with equal intervals (an interval of 60°) along the circumferential direction of the body section 61.

In the embodiment 3 formed in this way, the same effect as the embodiment 1 can also be achieved. Additionally, in the embodiment 3, the sections sunk into the electrodes 31*b* and 31*c* can be increased to six positions, therefore, compared with the embodiment 1, the centering function of the body section 61 to the central section of the electrodes 31*b* and 31*c* can be further enhanced.

Next, an embodiment 4 of the disclosure is described in detail with reference to the drawings. In addition, sections having the same function as the embodiment 1 are marked with the same symbols, and the detailed description is omitted.

Figure 12:
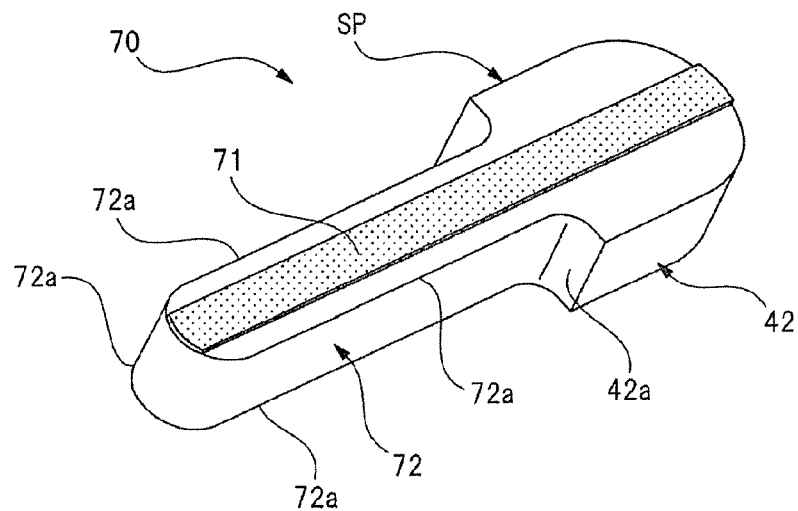
FIG. 12 is a perspective view showing a conductive component of embodiment 4.

FIG. 12 is a perspective view showing a conductive component of the embodiment 4.

A conductive component 70 of the embodiment 4 is formed to a predetermined shape by stamping (punching) a steel plate SP which is coated with a conductive paint 71 on the surface (the shaded section in the drawing) in advance. More specifically, the conductive component 70 includes a body section 72 which is inserted into the space between the electrodes 31*b* and 31*c* (see FIG. 5), and a head 42 which limits the insertion depth of the body section 72 into the insulating tube 31*a* (see FIG. 5). In addition, stainless steel with low conductivity (high resistance value) and the like are used in the steel plate SP which becomes the base material of the conductive component 70.

The cross section of the body section 72 along a direction across the longitudinal direction is approximately square-shaped. And on the outer circumference section of the body section 72, four convex sections 72*a* extending along the longitudinal direction of the body section 72 are arranged. These convex sections 72*a* are arranged across the whole area of the body section 72 in the longitudinal direction, and sink into the electrodes 31*b* and 31*c* in the state of being inserted into the space between the electrodes 31*b* and 31*c* (see FIG. 5) inside the insulating tube 31*a*. Besides, the four convex sections 72*a* are disposed with equal intervals (an interval of 90°) along the circumferential direction of the body section 72.

Furthermore, the conductive paint 71 is arranged in a shape of strip on a part of the surface of the conductive component 70, and extends along the longitudinal direction of the conductive component 70. That is, the conductive paint 71 is arranged across both the body section 72 and the head 42 of the conductive component 70. Besides, the conductive paint 71 has a predetermined thickness. That is, the conductive paint 71 is arranged to protrude from the surface of the steel plate SP for a predetermined height.

In this way, in the state where the body section 72 is inserted into the space between the electrodes 31*b* and 31*c*, the front end sides (the ends in the longitudinal direction) of the electrodes 31*b* and 31*c* are electrically and definitely connected with each other via the conductive paint 71. Moreover, as shown in FIG. 12, the conductive paint 71 is coated only on the front surface side (the upper side in the drawing) of the steel plate SP, and is coated in a shape of strip on a part of the front surface, but is not coated on the back surface side (the lower side in the drawing) of the steel plate SP. In this way, the cost of painting is reduced. Besides, for example, a polyester based painting, which is formed by containing a predetermined quantity of carbon (C) particles (carbon black) is adopted as the conductive paint 71 paintings.

In the embodiment 4 formed in this way, the same effect as the embodiment 1 can also be achieved. Besides, in the embodiment 4, the steel plate SP is used in the base material of the conductive component 70 so that the strength of the conductive component 70 can be greatly enhanced. Accordingly, the yield can be further improved without any loss of the conductive component 70.

Next, an embodiment 5 of the disclosure is described in detail with reference to the drawings. In addition, sections having the same function as the embodiment 4 are marked with the same symbols, and the detailed description is omitted.

Figure 13:
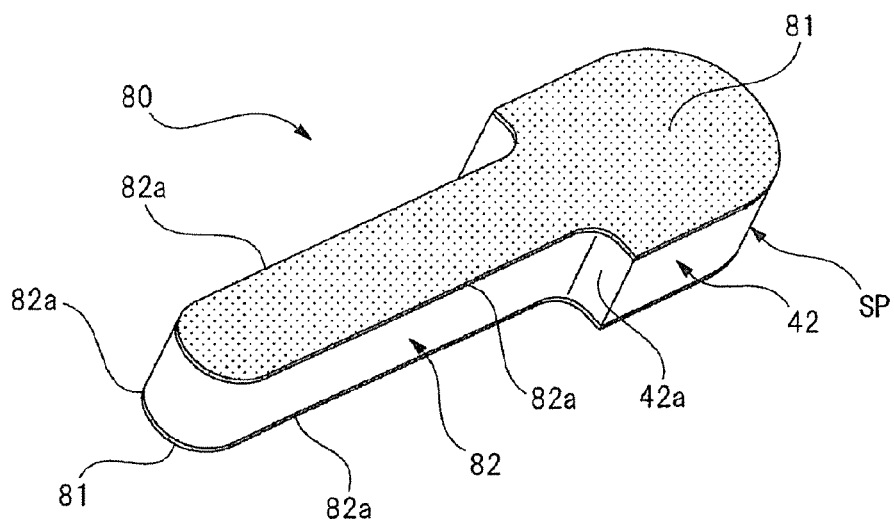
FIG. 13 is a perspective view showing a conductive component of embodiment 5.

FIG. 13 is a perspective view showing a conductive component of the embodiment 5.

A conductive component 80 of the embodiment 5 is formed to the same shape of the conductive component 70 of the embodiment 4 by stamping (punching) the steel plate SP which is coated with a conductive paint 81 (the shaded section in the drawing) on the whole front surface and back surface in advance. In this way, the conductive paint 81 is disposed on the section of four convex sections 82*a* which are arranged on the outer circumference section of the body sections 82. Accordingly, the four convex sections 82*a* on which the conductive paint 81 is disposed can be made to sink into the electrodes 31*b* and 31*c* (see FIG. 5).

In the embodiment 5 formed in this way, the same effect as the embodiment 4 can also be achieved. Besides, in the embodiment 5, the conductive paint 81 is coated on the whole front surface and back surface of the conductive component 80, so that the four convex sections 82*a* on which the conductive paint 81 is disposed can be made to sink into the electrodes 31*b* and 31*c*. Therefore, the front end side of the electrodes 31*b* and 31*c* can be electrically connected with each other more definitely.

The disclosure is not limited to the above embodiments, and can be modified in various ways without departing from the spirit of the disclosure. For example, in the embodiments above, the touch sensor unit 20 of the disclosure is arranged on the power tailgate device 13 which serves as an automatic opening/closing device mounted on the vehicle 10, but the disclosure is not limited to this situation and can also be applied to a sunroof device, a slide door device or a power window device and so on which is mounted on a vehicle. To sum it up, the disclosure can be applied to an automatic opening/closing device which is mounted on a vehicle and can open and close automatically.

Besides, as long as the disclosure can be achieved, the material, shape, size, number, position and so on of the structural elements of the above embodiments can be arbitrarily set, without being limited to the above embodiments.

What is claimed is:

1. A touch sensor unit, which is used to detect contact of a blocking, comprising:
    a hollow insulating component, which deforms elastically due to a stress of an external force;
    a pair of electrodes, which are arranged inside the insulating component, extend spirally along a longitudinal direction of the insulating component, and are placed to be capable of contacting with each other by an elastic deformation of the insulating component; and
    a conductive component, which is arranged at one end of the longitudinal direction of the pair of electrodes, and electrically connects with the pair of electrodes respectively;
    wherein the conductive component comprises:
        a body section, which is arranged between the pair of electrodes, and extends along the longitudinal direction of the insulating component; and a convex section, which is arranged on an outer circumference of the body section, extends along the longitudinal direction of the body section, and sinks into the pair of electrodes.

2. The touch sensor unit according to claim 1, wherein at least three convex sections are arranged in a circumferential direction of the body section.

3. The touch sensor unit according to claim 1, wherein a length of the body section is a length obtained by winding the pair of electrodes which are spirally arranged for at least half a circumference respectively.

4. The touch sensor unit according to claim 1, wherein the conductive component comprises a head which abuts on one end in the longitudinal direction of the pair of electrodes.

5. The touch sensor unit according to claim 1, wherein the conductive component is made of a conductive resin material.

6. The touch sensor unit according to claim 1, wherein the touch sensor unit is arranged on an automatic opening/closing device mounted on a vehicle.

7. The touch sensor unit according to claim 1, wherein the conductive component is made of a steel plate having a surface coated with a conductive paint.

8. The touch sensor unit according to claim 7, wherein the conductive paint is coated on a part of the surface of the conductive component.

* * * * *